United States Patent

[11] 3,624,643

[72] Inventor Peter L. Richman
22 Barberry Road, Lexington, Mass. 02173

[21] Appl. No. 858,682
[22] Filed Sept. 17, 1969
[45] Patented Nov. 30, 1971

[54] SIGNAL-TO-TIME CONVERTER
30 Claims, 16 Drawing Figs.

[52] U.S. Cl. .......... 340/347NT, 235/183
[51] Int. Cl. .......... H03r 13/02
[50] Field of Search .......... 340/347; 324/99, 77, 140; 328/127, 136, 158, 161; 235/183, 156, 196; 320/1

[56] References Cited

UNITED STATES PATENTS

| | | | |
|---|---|---|---|
| 3,549,874 | 12/1970 | Vachitis | 235/183 X |
| 2,672,284 | 3/1954 | Dickinson | 340/347 X |
| 3,316,547 | 4/1967 | Ammann | 340/347 |
| 3,380,035 | 4/1968 | Hecker | 320/1 X |
| 3,422,258 | 1/1969 | Charter et al. | 235/183 X |
| 3,480,949 | 11/1969 | Charbonnier et al. | 340/347 |
| 3,488,652 | 1/1970 | Huelsman | 340/347 |
| 3,525,032 | 8/1970 | Torok | 321/38 X |

*Primary Examiner*—Thomas A. Robinson
*Attorney*—Schiller & Pandiscio

ABSTRACT: A system for converting an input AC signal into a output signal having a time period or duration proportional to the full-wave average value of the input signal. The system is formed of a pair of integrators, one of which is connected to accept a reference voltage, the other connected to accept a full-wave rectified version of the input signal. Both integrators operate for the same time, following which the voltage on one is fed to the input of the other so that the latter reversely integrates back to its initial or zero condition. The time required to perform the reverse integration is the desired time period.

PETER L. RICHMAN
INVENTOR.

BY Schiller & Pandiscio

ATTORNEYS.

PETER L. RICHMAN
INVENTOR.
BY Schiller & Pandiscio
ATTORNEYS.

PETER L. RICHMAN
INVENTOR.

BY Schiller & Pandiscio
ATTORNEYS.

PETER L. RICHMAN
INVENTOR.
BY Schiller & Pandiscio
ATTORNEYS.

PETER L. RICHMAN
INVENTOR.

BY Schiller & Pandiscio

ATTORNEYS.

PETER L. RICHMAN
INVENTOR.
BY Schiller & Pandiscio
ATTORNEYS.

PETER L. RICHMAN
INVENTOR.

BY Schiller & Pandiscio

ATTORNEYS.

PETER L. RICHMAN
INVENTOR.
BY Schiller & Pandiscio
ATTORNEYS.

SIGNAL-TO-TIME CONVERTER

This invention relates to a signal conversion and more particularly to a system for providing an output signal proportional to a parameter of a time-varying input signal.

One of the most widely accepted techniques of the prior art concerned with the conversion of an input analog DC signal to a proportional digital value is that known as dual-slope integration and is exemplified by the device described in U.S. Pats. No. 3,051,939 issued Aug. 28, 1962 to R. W. Gilbert and U.S. Pat. No. 3,316,547 issued Apr. 25, 1967 to S. K. Ammann. Typically, this type of device operates as follows:

A DC input signal $e_i$ is integrated for a fixed time period $t_1$ to provide a voltage $E_1$ such that (1)
$$E_1=\int_0^{t_1} e_i dt=e_i t_1$$

The potential $E_1$ is used as the initial condition for integration of a negative DC reference voltage $-E_r$ over a second time period $t_2$ such that (2)
$$E_1-\int_0^{t_1} E_r dt=0$$

Since $E_r$ is constant, then (3) $E_1=E_r t_2$ and substituting from equation (1)

(4) $e_i t_1=E_r t_2$

Solving (4) for $t_2$ we find (5)
$$t_2=\frac{t_1}{E_r}e_i$$

Thus $t_2$ is proportional to the ratio of two constants ($t_1$ and $E_r$) and the input $e_i$. Measurement of $t_2$ as by counting pulses from a precise oscillator, will provide a digital number proportional to the DC input $e_i$. Importantly, the value of $t_1$ must be exactly known or predetermined.

Now to achieve the foregoing with an AC input is more difficult. Conventionally, the AC is converted to DC and the digital value of the latter is then determined. But conventional AC/DC conversion requires filtering to obtain the DC. The filter should be capable of handling the lowest frequency anticipated, and this introduces severe time delays. For example, to convert a wave ranging from 60 Hz. to 10 kHz. to comparable DC may require up to a few seconds time; for automatic measurements, multiplexed systems or any other "real-time" requirement, such a delay is quite unacceptable.

One specific object of the present invention is to convert an input analog AC signal to a time interval represented by a substantially steady-state output signal, either analog or digital, and is proportional to, for example, the average value of the input signal.

Typically, the foregoing object is achieved by applying the input AC wave $e_i(t)$ to an absoluting circuit to obtain $|e_i(t)|$. The first axis-crossing of $e_i(t)$ or some reference AC is used to start two integrators, one of which integrates the value $|e_i(t)|$ to a time $t_1$ which may be to the next axis-crossing of $e_i(t)$ or the reference AC. The other integrator integrates some reference value (either absoluted AC or DC) $E_r$ also during the time interval from zero to $t_1$. The result of the first integration of $|e_i(t)|$ is $E_1$ or $E_{AV}(t_1)$, where $E_{AV}$ is the average value of the input wave itself. The output $E_2$ of the second integrator is of course $E_r(t_1)$.

By using axis-crossings that are all only positive-going (or negative-going if desired) instead of successive or arbitrary axis-crossings of the input wave $e_i(t)$, the conversion may be restricted to full-wave average instead of either half or full-wave as previously described.

Means are provided for establishing an output signal proportional in some manner, preferably in duration, to a ratio of the two time integrals $E_1$ and $E_2$ thus obtained. The ratio can be obtained either explicitly or implicitly, and can be expressed as linearly or logarithmically related to the input wave $e_i(t)$.

To accomplish this end, one may use the value $E_2$ as the argument for a reverse integration starting from $E_1$ for a time interval $t_2$, or (6)
$$E_1=\int_0^{t_2} E_2 dt$$

Since $E_2$ is defined as $E_r(t_1)$, and $E_1$ has been defined as $E_{AV}(t_1)$, then (7) $E_{AV} t_1=(E_r t_1)t_2$ or (8) $E_{AV}/E_r=t_2$ or (9) $E_{AV}=kt_2$ Thus one obtains a time interval $t_2$ directly proportional to the average value of the absolute value of the input wave $e_i(t)$. If a digital representation is desired, one need only count down a clock during $t_2$. If an analog representation is desired, it can be easily obtained by integrating $E_r$ or some other reference value on another integrator during the interval $t_2$. Interestingly, $t_1$ need not be known precisely and no frequency information need be explicitly supplied to the converter to obtain the foregoing results. For example, if as in conventionally done in the prior art, $|e_i(t)|$ were integrated to obtain a final result, then

(10)
$$\int_0^{t_x}|e_i(t)|dt=E_{AV}t_x$$

The result is time-dependent or really frequency-dependent in view of the $t_x$ term. Division of $E_{AV}t_x$ by a multiple period $t_x$ of the wave $e_i(t)$ is required to obtain a result proportional to $E_{AV}$ alone.

The technique of the present invention thus described, i.e. separate integration of the signal and a reference over the same time interval and establishment of some ratio of the integrals, provides a very powerful approach to yield a number of unique conversion systems as will be seen in the following discussion.

Further objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

Figure 1:
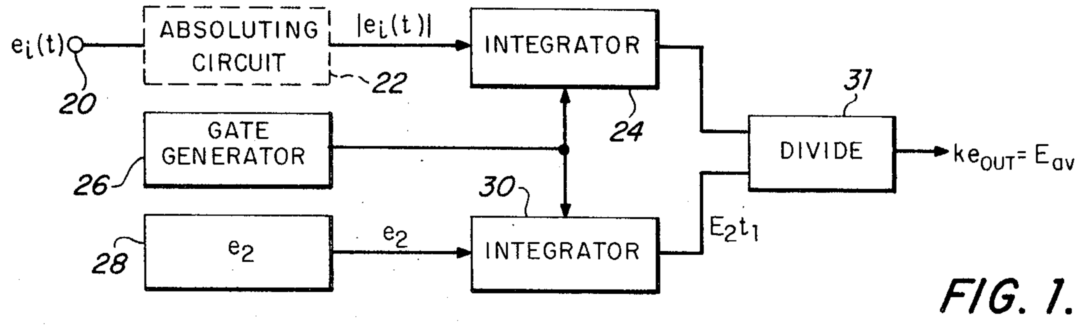
FIG. 1 is a block diagram of a simple form of one embodiment of the present invention.

Referring now to FIG. 1, there is seen a block diagram including an input terminal 20 at which an input waveform $e_i(t)$ can be applied. Terminal 20 is connected preferably through a known absoluting circuit 22 (shown in dotted line to indicate that it may in certain instances be omitted as where $e_i(t)$ is a DC signal) to the input of first integrating circuit 24. Absoluting circuit, typically for AC inputs, can be a full-wave rectifier such as a rectifying operational amplifier or the like. As known, the output of circuit 22 will thus be $e_i(t)$ and with this input the output of integrator 24 will be in the form $$\int_0^{t_1} e_i(t)\,dt \quad .$$

The time interval from 0 to $t_1$ is controlled by gate generator 26 which provides a signal of duration $t_1$ and is connected for controlling integrator 24 so that the latter integrates only during the interval $t_1$. In view of equation (10), the output of integrator 24 can be expressed as $E_{AV}t_1$ for $t_1$ as an integral number of half-cycles of the fundamental of the input $e_i(t)$.

The device of FIG. 1 also includes source 28 of a reference signal $e_2$ which may be a DC voltage, an absoluted AC or the like. Source 28 is connected to the input of second integrating circuit 30. The latter is also connected to gate generator 26 so that the integrating time of circuit 30 is controlled by the timing provided by generator 26. Thus, the output of integrator 30 is $$\int_0^{t_1} e_2 dt \text{ or } E_2 t_1 \quad .$$

The outputs from both integrators are connected to respective inputs of dividing circuit 31 which provides an output signal $e_{out}$ which is a ratio of the two input signals i.e. $E_{AV}/E_2$ or $E_2/E_{AV}$. Because $E_2$ is a constant, it will be apparent that there is a linear proportionality between the values of $e_{out}$ and $E_{AV}$. The conversion circuit has thus simple provided an AC/DC conversion where the DC is the "average" of $e_i(t)$, and the value of the output is independent of the number of half-cycles of the input during which the gate signal generator 26 allowed integrators 24 and 30 to integrate their respective inputs.

Figure 2:
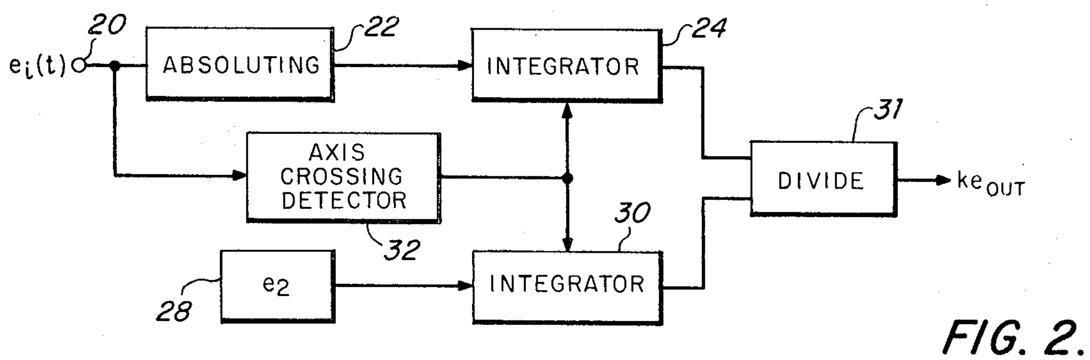
FIG. 2 is a block diagram of a simple form of yet another embodiment of the present invention.

While the circuit of FIG. 1 employs a gating generator to provide the requisite integrating period $t_1$, as shown in FIG. 2, the integrating period can be established on the basis of the fundamental of the input wave $e_i(t)$ if desired, thus permitting substantially one-cycle conversion without a prior knowledge of the input frequency. In FIG. 2 (wherein with respect to FIG. 1, like numerals denote like parts) input terminal 20 is intended to accept input AC wave $e_i(t)$ which is then fed to absoluting circuit 22 and the output of the latter in turn is fed to integrator 24. The device also includes reference signal ($e_2$)source 28 which is connected to integrator 30. To provide timing control for both integrators, the device includes axis-crossing detector 32 typically connected to the input of absoluting circuit 22 so that it can detect axis-crossings of the wave $e_i(t)$ by noting polarity changes occurring at axis-crossing or the like. The axis-crossing detector can include a counter so that detector 32 produces an output signal having a time interval of "$n$" half-cycles of the input wave. The time interval provided by the detector 32 then determines the actual integration time of integrators 24 and 30. The output signals from the latter are explicitly divided by circuit 31 whose output is independent of "$n$" in view of the use of two integrations.

Figure 3:
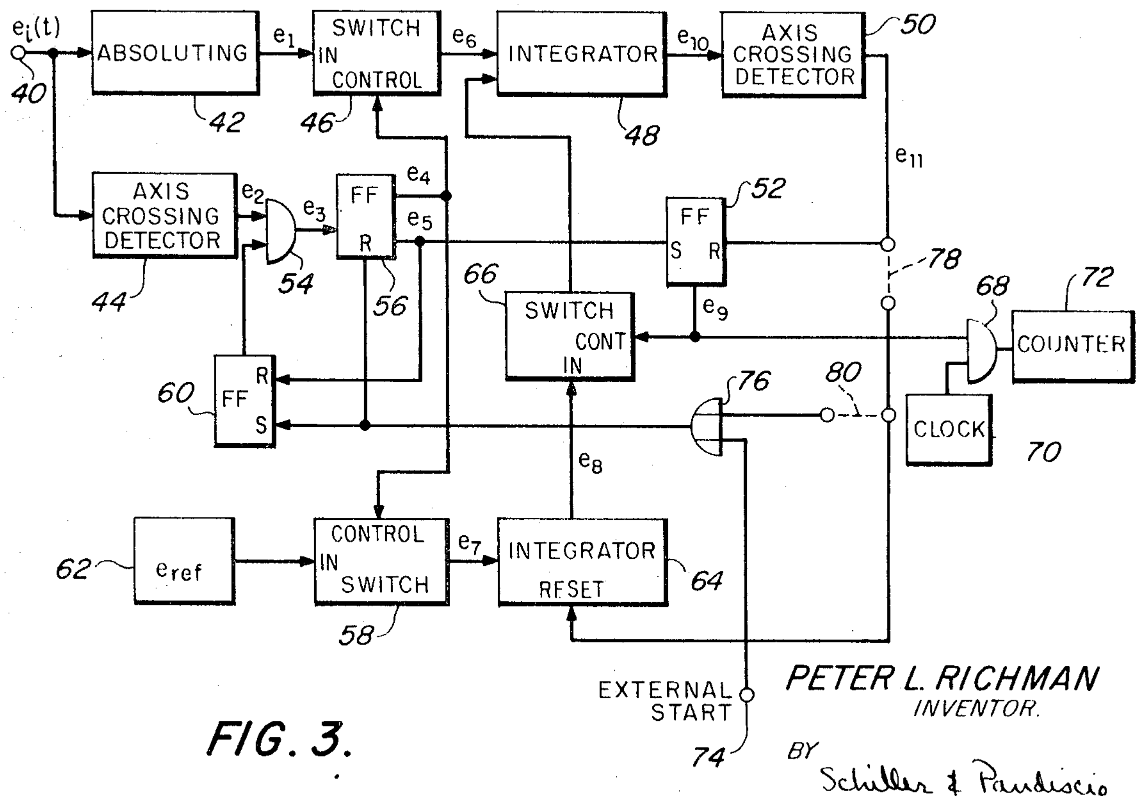
FIG. 3 is another block diagram illustrating a more detailed implementation of the principles of the present invention.
Figure 4:
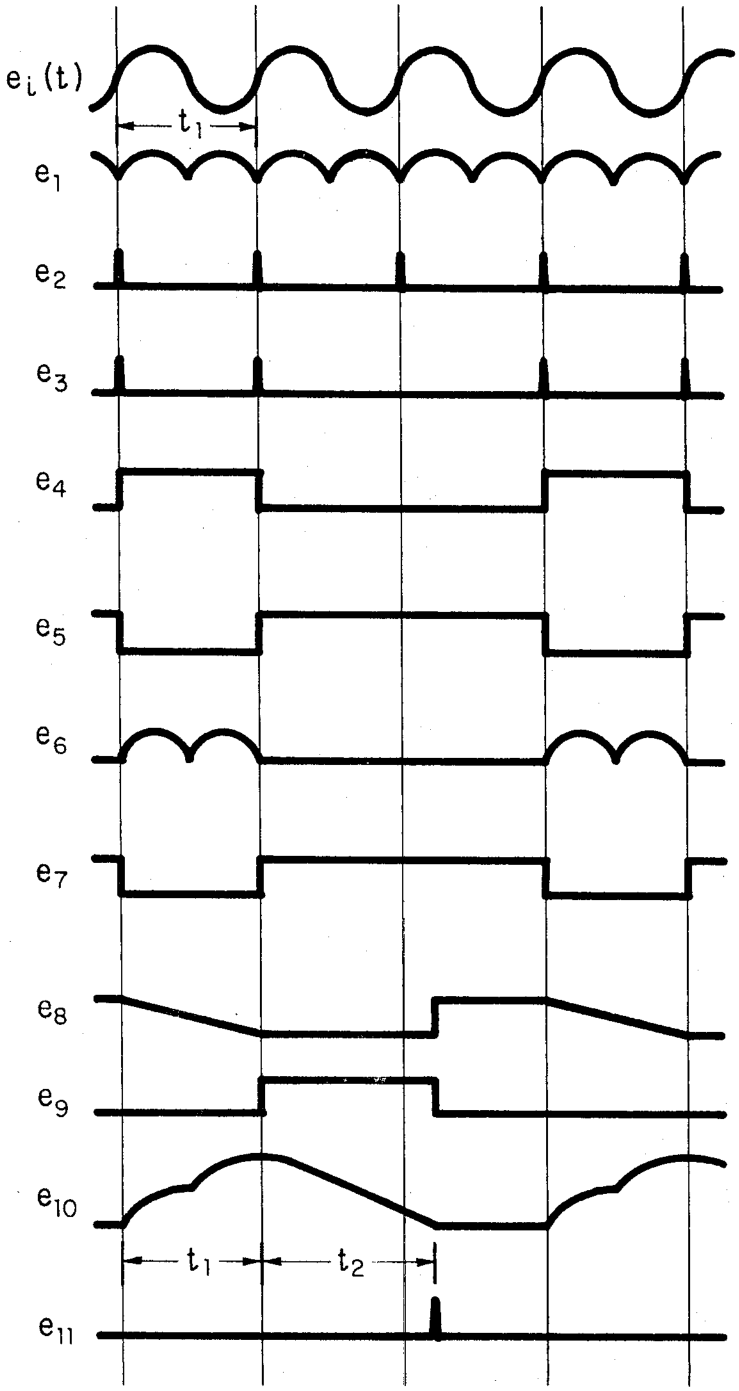
FIG. 4 is a set of idealized waveforms using a common time base illustrating the operation of the embodiment of FIG. 3.

Turning now to FIG. 3, there is shown a more detailed embodiment of the present invention in the form of a converter that integrates the absolute value of the input waveform over one cycle of that input. FIG. 4 shows representative waveforms at points in the device of FIG. 3 and will be referred to in the description hereinafter of the latter. The device of FIG. 3 includes input terminal 40 at which the input wave $e_i(t)$ is intended to be applied, terminal 40 being connected to both the input of absoluting circuit 42 and the input of axis-crossing detector 44. Switch 46 has input, output and control terminals, the input terminal being connected to the output of circuit 42 and the output terminal being connected to the input of integrating circuit 48. The output of integrator 48 is connected to the input of another axis-crossing detector 50, the output of which in turn is connected to the reset terminal of flip-flop 52.

The output of axis-crossing detector 44 is connected to an input terminal of AND-gate 54, the output of which is connected to the toggle or count terminal of flip-flop 56. The latter also includes a reset input terminal and two complementing (negation and assertion) output terminals. The assertion terminal (at which positive polarity waveforms appear for example) of flip-flop 56 is connected to a reset terminal of flip-flop 60. An output terminal of flip-flop 60 (at which signals of appropriate polarity can appear) is connected to the other input terminal of AND-gate 54.

The input and output terminals of switch 58 are respectively connected to source 62 of reference voltage $e_{ref}$, for example a DC voltage, and to the input of resettable integrator circuit 64. The output of the latter is connected to the input of yet another switch 66 having its control terminal connected to an appropriate output of flip-flop 52. The output of switch 66 is connected to an input to integrator 48. The output of flip-flop 52 is also connected to one of two inputs of AND-gate 68, the other input of the latter being typically connected to the output of clock 70. The output of AND-gate 68 is connected to digital counter 72.

Lastly, an external start pulse terminal 74 is provided and connected, through OR-gate 76 to the set terminal of flip-flop 60 and the reset terminal of flip-flop 56. An input to OR-gate 76 can also be provided by connecting (shown as broken line jumpers 78 and 80) to the output of detector 50. Similarly the reset terminal of integrator 64 can be connected through jumper 78 to the output of detector 50.

As shown in FIG. 4 an input AC waveform typified by that marked $e_i(t)$ is applied at terminal 40 and thus to absoluting circuit 42 and axis-crossing detector 44. The output of circuit 42 is typically a full-wave rectified version of the input and is shown marked $e_1$. Assuming that axis-crossing detector 44 operates to provide a pulse or spike coincident with only positive-going axis-crossings of the input wave form, the output of detector 44 will be the waveform identified as $e_2$.

Means are provided for generating a gating signal starting with one pulse from detector 44 and terminating with the next of the pulses. To this end, assuming flip-flop 60 to be set, the output of the flip-flop enables gate 54 so that the first pulse from detector 44 can be applied as the gate output (shown at $e_3$ in FIG. 4) to the toggle terminal of flip-flop 56. This first pulse then causes the output on the assertion terminal of flip-flop 56 to rise (as shown in FIG. 4 at $e_4$) and switches 46 and 58 to close. Also, at the same time, the signal at the negation terminal of flip-flop 56 drops (as shown at $e_5$ in FIG. 4). The next pulse in $e_3$ through gate 54 again toggles flip-flop 56 causing the voltage at its assertion terminal to fall and at its negation terminal to rise. This positive-going transition at the negation terminal serves to reset flip-flop 60 and thus disable gate 54. Until another set pulse is received by flip-flop 60, no more pulses from detector 44 can pass gate 54. The negative-going transition at the assertion terminal serves to open switches 46 and 58.

The closure of switch 46 enables the absolute value signal from circuit 42 to pass through to integrator 48 during the gating interval as shown at $e_6$ in FIG. 4. Similarly, switch 58 gates a steady-state potential (preferably of opposite polarity to the polarity of the absolute value signal from circuit 42) from source 62 to integrator 64 as shown at $e_7$ in FIG. 4. Each integrator integrates its respective input signal during the gating interval defined by operation of flip-flop 56. Thus, the output from integrator 64 typically will be as shown at $e_8$ in FIG. 4. At the end of the gating interval, the same signal transition that resets flip-flop 60 is used to set flip-flop 52 which then provides a signal such as is shown at $e_9$ in FIG. 4. This signal controls closure of switch 66 so that the stored voltage in circuit 64 is applied as an input to integrator 48. It will be seen that at the end of the gating interval, the signal (at $e_8$) has achieved a value $E_2$ proportional to both the reference potential $e_r$ and the integration interval $t_1$ or $E_2=-e_r t_1$.

It will be appreciated that integrator 48, during the time interval $t_1$, also has summed or integrated the signal shown at $e_6$ to provide the portion of the signal shown at $e_{10}$ occuring during $t_1$. The introduction of the signal $e_8$ as an input to integrator 48 causes the latter to perform another function, i.e. ramp back down linearly toward zero from the summed voltage $E_{AV}t_1$ reached at the end of $t_1$. This reverse integration occurs at a rate proportional to the new input $-e_r t_1$, essentially carrying out the function expressed in equation (6). The time interval required for the output of integrator 48 to reach zero (or its original base level), is $t_2$ as shown in connection with $e_{10}$ in FIG. 4.

The zero axis (or base line) intercept of the waveform $e_{10}$ is detected by axis-crossing detector 50 which generates a signal such as is shown at $e_{11}$ in FIG. 4, in the form of a pulse. This pulse serves to provide a number of reset function as will be seen. In particular, where the conversion performed is AC to digital, jumpers 78 and 80 should be in place so that the pulse of $e_{11}$ necessarily must reset flip-flop 52 (and thus provides the negative-going transition terminating the signal in $e_9$) and also resets integrator 64 to zero (as is shown in the positive-going transition terminating the waveform at the end of $t_2$ in $e_8$). In addition, the $e_{11}$ pulse travels through OR-gate 76 and sets flip-flop 60 and resets flip-flop 56. The latter is basically merely a safety precaution to insure that flip-flop 56 is in the correct condition to start another cycle.

While integrator 48 is ramping down during $t_2$, both switches 46 and 58 should of course be kept open to isolate both integrators from their respective sources of input signals. This happens simply because the reset signal ($e_{11}$) from detector 50 cannot occur until the down ramp has intercepted the zero axis. Any pulses from detector 44 occuring during $t_2$ cannot pass gate 54 as is shown at $e_3$ in FIG. 4.

The gating signal generated by flip-flop 52 (shown at $e_9$ in FIG. 4) has a duration $t_2$. That is, as previously explained, a direct measure of the average value $E_{AV}$ of the input $e_i(t)$. Its duration is conveniently measured by using the output of flip-flop 52 to enable gate 68 so that a train of high repetition rate pulses from clock 70 can be counted in counter 72.

It will be appreciated that by breaking the circuit at jumper 80 one can prevent the system from restarting automatically, any start then depending on the application of a pulse at terminal 74. If one instead simply opens the circuit at jumper 78, both reset of integrator 64 and restarting of the circuit are prevented.

Figure 5:
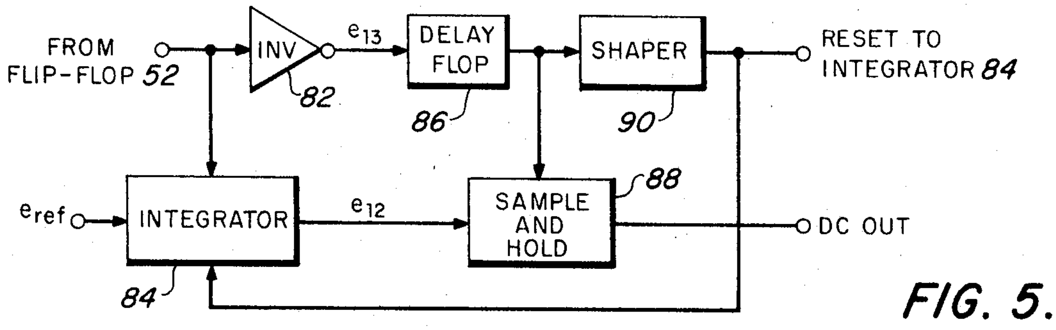
FIG. 5 is a block diagram of an alternative readout system for use with a device such as is shown in FIG. 3.

Other known systems for measuring $t_2$ can be employed with similar results. For example, rather than a digital count, one may desire to obtain a DC voltage representing the average value of $e_i(t)$. This can be done for example by deriving the DC from the gate signal from flip-flop 52, as shown in FIG. 5. The circuit of FIG. 5 is to be used as an adjunct to the circuit of FIG. 3. The operation of the system of FIG. 5 can be conveniently described in connection with the waveforms of FIG. 6 which include, for reference, the waveforms marked $e_i(t)$ and $e_9$ of FIG. 4.

First opening the jumper 78 of the circuit of FIG. 3 and using the signal from flip-flop 52 (shown as $e_9$ in FIG. 6) as an input to inverter 82 of FIG. 5 and as a control-signal to integrator 84 of FIG. 5, the latter therefore integrates DC input voltage $e_{ref}$ for a time ($t_2$) set by the duration of the $e_9$ signal. The output signal therefore from integrator 84 is shown at $e_{12}$ in FIG. 6. The voltage achieved by integrator 84 is therefore $e_{ref}t_2$. The output from inverter 82 is shown as $e_{13}$ in FIG. 6, being merely an inverted form of $e_9$. Because the output terminal of inverter 82 is connected to the input of delay multivibrator 86, the trailing edge or positive-going transition of waveform $e_{13}$ triggers multivibrator 86 to provide an output waveform of fixed duration $t_3$ such as is shown at $e_{14}$ in FIG. 6. This latter need only be long enough to insure transfer of the signal from the output of integrator 84 to sample-and-hold circuit 88. The latter, of course, may be a gated integrator or the like. Thus, the output of multivibrator 86 is connected to gate the operation of circuit 88. As shown at $e_{15}$ in FIG. 6, the value or amplitude of the voltage in circuit 88 therefore changes from its previous value to a different level, presuming that the input AC has changed. The time constant of the change is exaggerated in the diagram in order to show that it is effected over a finite time. The DC output from circuit 88 is thus the desired analog value and can be displayed on a DC meter or the like.

Figure 6:
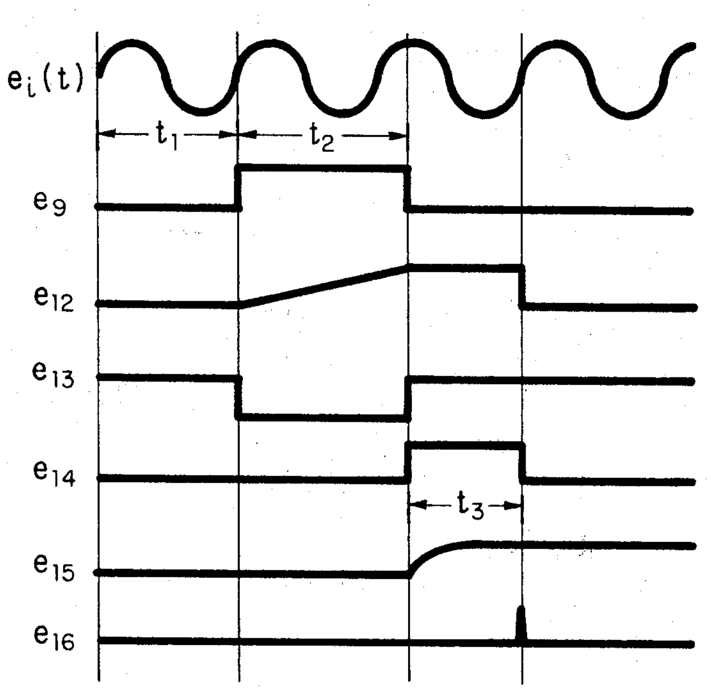
FIG. 6 is a set of idealized waveforms, on the same time base as FIG. 4, illustrating the operation of FIG. 5.

The output of the delay multivibrator is also connected to shaper circuit 90 so that termination of the gating signal from the multivibrator causes a pulse to appear at the output of circuit 90 as shown in $e_{16}$ in FIG. 6. The shaper output is connected to integrator 84 so that the pulse can reset the latter to zero.

Figure 7:
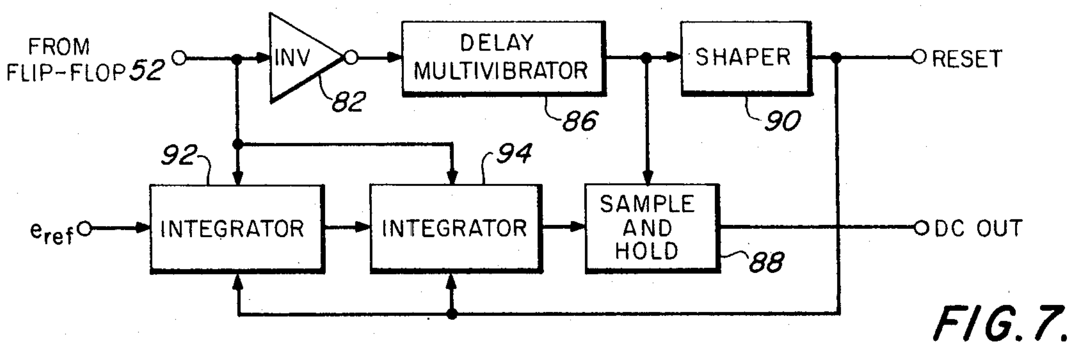
FIG. 7 is a variation of the device of FIG. 5 employing two integrators in series to obtain a double integral.

An interesting variation on the circuit of FIG. 5 can be made as shown in FIG. 7 (wherein like numerals denote like parts) by putting the DC reference voltage, $e_{ref}$ through two integrators 92 and 94 in series, rather than through but a single integrator. This will furnish a DC proportional to the square of the input AC inasmuch as the double integral of a constant with respect to time is $t^2$. Here of course $t^2$ is actually $(t_2)^2$, and because $t_2$ is proportional to $E_{AV}$, the output DC is proportional the square of $E_{AV}$.

Figure 8:
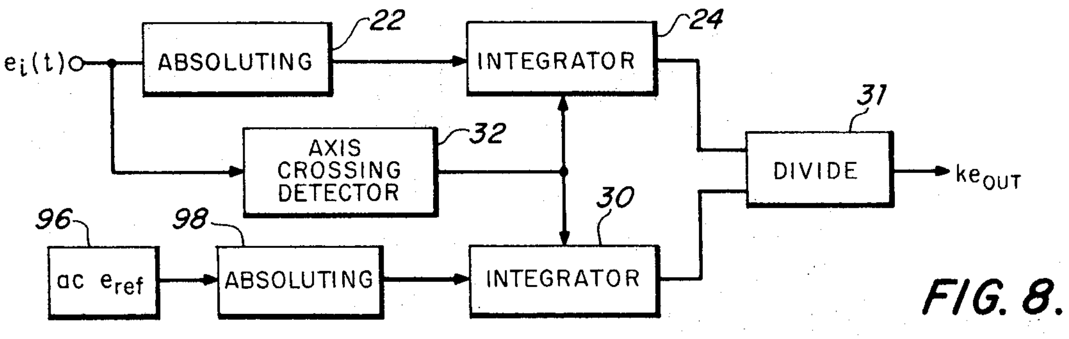
FIG. 8 is another variation of the device of FIG. 2 wherein the reference employed is an AC signal.

Yet another variation of the circuit of FIG. 2 is that shown in FIG. 8 wherein the reference signal is source 96 of an AC voltage of the same frequency as $e_i(t)$, rather than a DC voltage. Source 96 is connected to absoluting circuit 98, the output of the latter being connected to the input of integrator 30. In this manner, the output time duration or $t_2$, which may be expressed either in digital or analog form, can be proportional not to $E_{AV}/E_r$ (or $E_{AV}/K$ where $K$ is some constant scale factor) but $E_{AV_1}/E_{AV_2}$ the ratio of two AC signals. This important since the ratio is simultaneously taken with respect to the two AC waves. Since AC values being measured may change rapidly from cycle to cycle under field conditions, it is thus possible to obtain AC/AC ratio measurements at concurrent or synchronous time for the two signals, a measurement believed to be heretofore impossible with prior art devices. This reduces the need for AC references with constant amplitudes. It should be noted that the two AC signals may be phase shifted with respect to one another inasmuch as the absolute values over an integral number of half-cycles are what are being computed. It should also be noted that the AC reference in the device of FIG. 8 can alternatively be used to provide the information to an axis-crossing detector such as 44 of FIG. 3 instead of using the input $e_i(t)$ for this purpose.

In any of the foregoing systems for providing a DC output voltage proportional to the input AC the sample-and-hold 88 can be a zero order or higher device. As is well known to those skilled in the art, a zero order sample-and-hold merely steps to a new value each time it is programmed or commanded to do so, and then holds that value until the next command. A first order sample-and-hold, instead of holding at the new value, continues changing at a rate proportional to the difference between the new value and its immediate predecessor, thereby allowing the device to follow changing signals with smaller dynamic errors attributable to input signal "velocity" or first derivative. Second and higher order sample-and-hold devices, in which the rate of change from value to value entered into the device is a more complex function, used to more closely approximate the actual slope of the change, can also be used if one wishes to reduce errors due to input "acceleration" or the like.

It will be seen that the device of FIG. 3 provides essentially an AC rectification where the so-called whole absolute average value of the AC is represented as some steady-state digital or analog value. On the other hand, one might wish to provide phase-sensitive rectification, i.e. to provide an output proportional to the peak value of the input signal multiplied by the cosine of the phase angle between the input AC and some phase reference AC wave. Clearly if the input wave $e_i(t)$ is compared in phase to itself, then the cosine of the phase angle is unity and full-wave rectification occurs exactly as in the embodiment of FIG. 3. A phase-sensitive version of the present invention therefore requires a separate phase reference AC signal.

Figure 9:
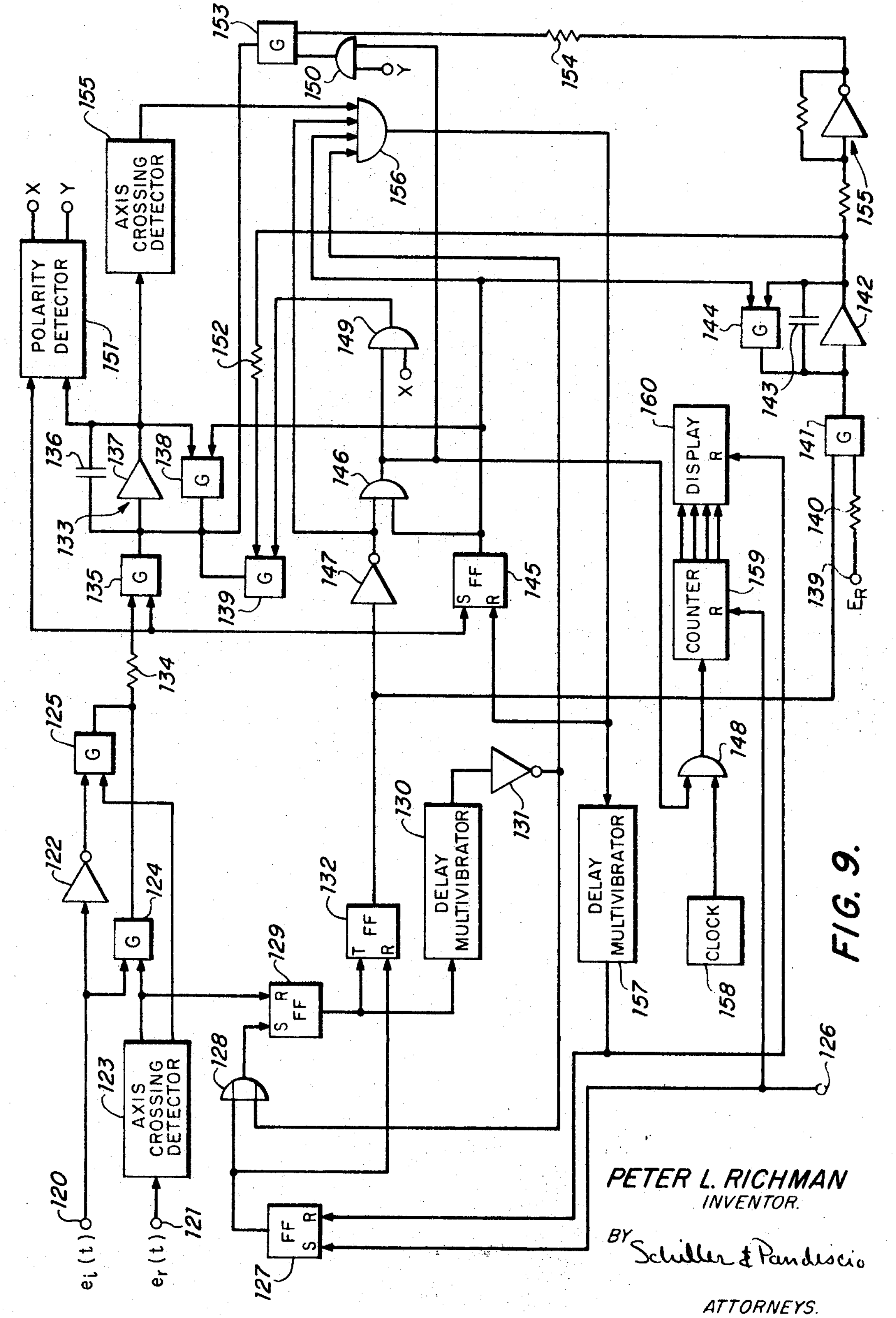
FIG. 9 is yet another embodiment of the principles of the present invention shown in block diagram.

Referring now to FIG. 9, there is shown in detail a phase-sensitive version of the embodiment of FIG. 3. Here, the device includes a pair of terminals 120 and 121 which are respectively intended to accept the input waveform being converted and phase reference AC signal so as to provide a phase-sensitive conversion. The phase reference signal $e_{fr}$ applied to terminal 121 should be of substantially the same frequency, but not necessarily in phase with, the input signal $e_i(t)$. To achieve ordinary or whole average conversion with the device of FIG. 9, only the same input $e_i(t)$ need be applied simultaneously at both terminals 120 and 121.

Terminal 121 is connected to the input of an axis-crossing detector 123 of the type which produces a square wave of the same frequency as its input. Terminal 120 is connected to an absoluting circuit comprising inverter 122 and analog gages 124 and 125. The output of one polarity from detector 123 is connected to provide enabling signals for gate 124 while the opposite polarity output from detector 123 enables gate 125. Gate 124 is also connected so that terminal 120 constitutes another input to it. The other input of gate 125 also is connected to the output of inverter 122.

Timing or gate signal generation is provided by flip-flop 127 which has its set terminal connected to input start signal terminal 126; by logical OR-gate 128 through which the output of flip-flop 127 is connected to the set terminal of second flip-flop 129; and by delay multivibrator 130 having its input connected to the output of flip-flop 129 and its output in turn connected through inverter 131 and thence through OR-gate 128 to the set terminal of flip-flop 129. Also included is third flip-flop 132 which has its input trigger or count terminal connected to the output of flip-flop 129 and its reset terminal connected to the output of flip-flop 129 and its reset terminal of flip-flop 129 is connected to the terminal at which positive polarity square waves are provided from detector 123.

The device includes first or input signal integrator 133 having an input resistor 134 and first input analog gate 135. The latter typically can be a junction FET (as may all the analog gates) and is connected so as to be enabled by an output from flip-flop 132. Integrator 133 also includes feedback capacitor 136 around high-gain inverting amplifier stage 137. A feedback analog gate 138 is also connected between the input summing junction and output of amplifier 137. Second input analog gate 139 is also provided and has its output connected to the input summing junction of integrator 133.

Terminal 139 is intended to have a steady-state reference voltage applied thereto and is connected through input resistor 140 and analog gate 141 to operational integrator 142. The control signal for gate 141 is derived by the connection of the latter to the output of flip-flop 132. Integrator 142 has a high-gain amplification stage, the output and input of which is connected through feedback capacitor 143 and connectable through analog feedback gate 144.

Another flip-flop 145 has its set terminal connected to the output of flip-flop 132. The output of flip-flop 145 is connected to the control terminal of gate 144 and also to one input of logical AND-gate 146, the other input of the latter being connected through inverter 147 to the output of flip-flop 132. The output of AND-gate 146 is connected as in input to logical AND-gates 148, 149 and 150.

The device includes polarity detector 151 connected to the output of integrator 133 for determining the polarity of the output signal from the latter and having then two output terminals X and Y at which the detected polarity is indicated by appropriate energization of a corresponding one of the terminals. Terminal X is connected as the other input to gate 149 and terminal Y is connected as the other input to gate 150. The output of logical gate 149 is connected as the control input for analog gate 139 while the signal input to the latter is derived from a connection through input resistor 152 from the output of integrator 142.

The device of FOG. 9 also includes a third analog input gate 153 having its output connected to the input summing junction of integrator 133, its control input connected to the output of logical gate 150 and its signal input connected through input resistor 154 to the output of precision inverter 155. The input to the latter is connected to the output from integrator 142.

Another axis-crossing detector 155 is connected to the output of integrator 133. The outputs from detector 155, inverter 131, flip-flop 145 and inverter 147 are all connected as inputs to logical AND-gate 156. The output of the latter in turn is connected to the reset terminal of flip-flop 145 and to the input of another delay multivibrator 157. The output of the latter is connected to the reset terminal of flip-flop 127.

Lastly, for conversion of the time interval determined into a visual display, the device of FIG. 9 includes a high repetition rate pulse source or clock 158 connected as the other input to logical gate 148. The output of the latter then is connected to digital counter 159 which in turn is connected to display device 160. The reset terminal of counter 159 is connected to input terminal 126 and the reset terminal of display 160 is connected to the output of delay multivibrator 157.

Figure 10:
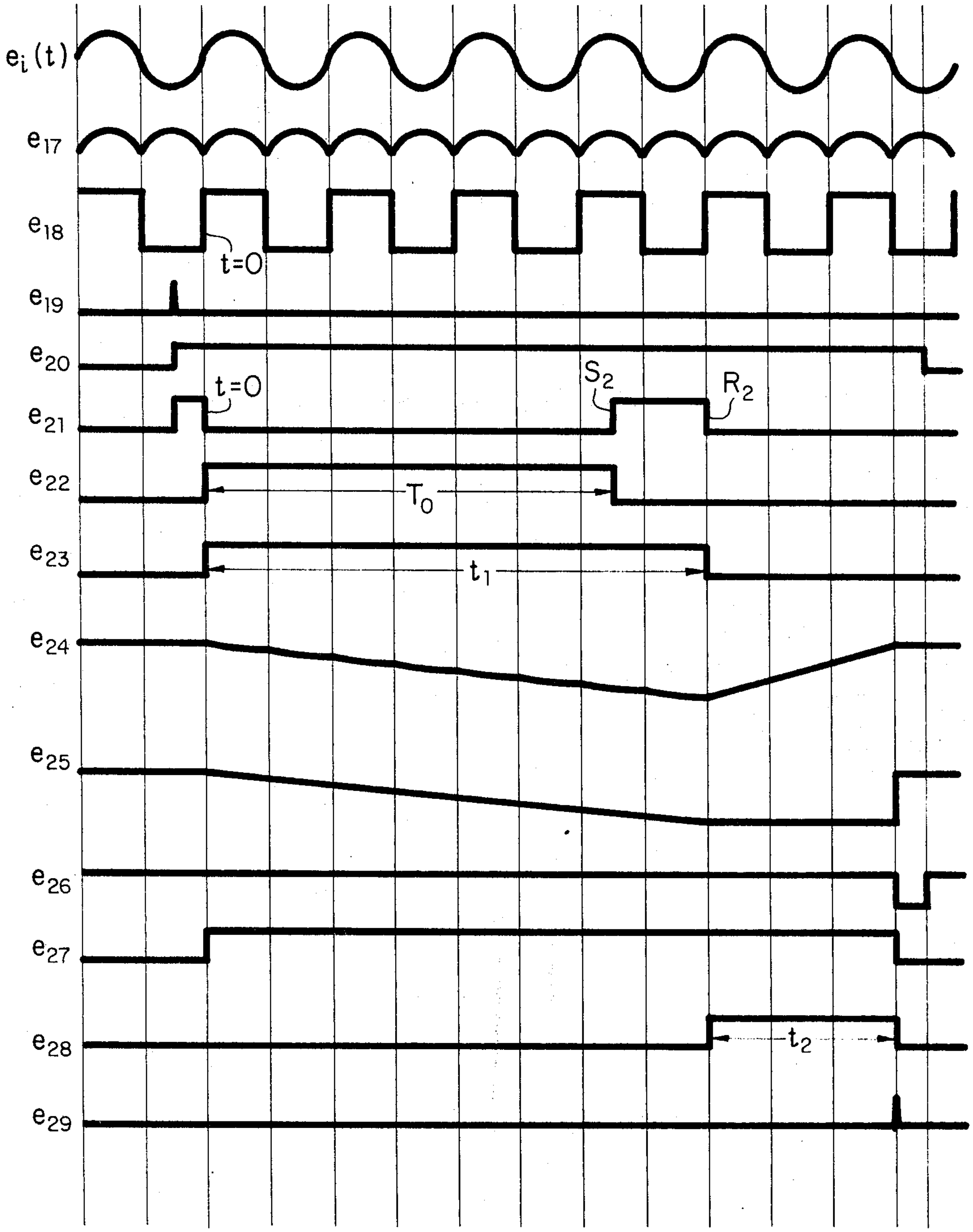
FIG. 10 is a set of idealized waveforms on a common time base, illustrating the operation of the device of FIG. 9.

The input waveform $e_i(t)$ of FIG. 10 is applied to terminal 120 of FIG. 9. It should be assumed that another AC signal $e_r(t)$ is used as the phase reference applied to terminal 121.

The input $e_i(t)$ applied to terminal 120 is furnished to inverter 122 for the purpose of obtaining the absolute value of the input. The phase reference $e_r(t)$ applied to terminal 121 is fed to axis-crossing detector 123, which supplies a square wave version of the $e_r(t)$ quasisinusoid, being shown in FIG. 10 as the square wave input $e_{18}$ of one polarity. $\overline{e_{18}}$, the opposite polarity square wave output from detector 123, is not shown explicitly in FIG. 10. For simplicity, the waveforms of FIG. 10 are based on the presumption that $e_i(t)$ and $e_r(t)$ being in phase with one another.

The two square waves, $e_{18}$ and its inverse $e_{18}$ are applied as gating inputs to AND-gates 124 and 125 respectively, the other inputs to each of the AND gates being the input itself, $e_i(t)$ for gate 124, the output of inverter 122 which is the opposite polarity of the input signal, for gate 125. The junction of the outputs from the two gates 124 and 125 is then the required absolute instaneous version of the input, as shown at $e_{17}$ in FIG. 10. It comes about through alternate selection of the opposite polarities of the input $e_i(t)$ during alternate half-cycles, via gates 124 and 125 and the opposite polarity square wave gating signals $e_{18}$ and$e_{18}$.

It is assumed that an external read command is furnished to the AC converter, in the form of the pulse such as $e_{19}$ of FIG. 10 applied to terminal 126. If indeed the converter is to free run, i.e. not require a command to tell it when to take a reading, it is a simple matter to one skilled in the art to include a free-running multivibrator to produce read command pulses with any required frequency.

The read command applied to terminal 126 appears at the set input of flip-flop 127. The output from flip-flop 127 is thus as shown as $e_{20}$ in FIG. 10, i.e. set at a time coincident with arrival of the read command pulse at terminal 126. The positive or leading edge of the $e_{20}$ signal passes through OR-gate 128 to set flip-flop 129. The output signal from flip-flop 129 is depicted in FIG. 10 as $e_{21}$, with a positive edge coincident with the triggering by flip-flop 127, in turn coincident with the read command pulse.

The purpose of the action of the two flip-flops 127 and 129 is to facilitate selection of the next positive-going leading edge from the output wave ($e_{18}$) from detector 123, to start the first integration period $T_1$. This first edge indeed resets flip-flop 129 at a time designated $t=0$ in connection with waveforms $e_{18}$ and $e_{21}$ in FIG. 10. Resetting flip-flop 129 supplies a negative-going edge at $t=0$ to the input of delay multivibrator 130. The output of the latter is shown as $e_{22}$ in FIG. 10, as having a fixed period $T_o$ independent of the input frequency. $T_o$ is conveniently set so that a full-scale input AC voltage will integrate to half of full-scale integrator output in a period equal to the longest (i.e. for the lowest frequency) for which the converter is designed to operate. Thus, if the period is longer, no axis-crossing will occur during the interval $T_o$ and a light or other alarm indicating that the input frequency (or amplitude, for that matter) is out of range can be illuminated. If however at least one axis-crossing has occurred during $T_o$ then the integration may be stopped—determining $t_1$—at the next axis-crossing to occur.

Alternately, the interval $T_o$ may be established at just less than the longest period to be anticipated at the input, and the requirement for an intermediate axis-crossing not imposed; the indication of overload (i.e. too low a frequency) is obtained merely from a determination that the integrator output goes beyond allowable limits. This is the approach that is shown implemented in FIG. 10.

The trailing edge of the interval $T_o$ established by the one-shot or delay multivibrator 130 sets flip-flop 129 again (as shown at $S_2$ in waveform $e_{21}$ of FIG. 10) via OR-gate 128 after inversion by inverter 131. Thus flip-flop 129 is again primed to pick up the next positive-going axis-crossing signal from axis-crossing detector 123, this next positive-going edge resetting flip-flop 129 once again, as shown at $R_2$ in waveform $e_{21}$ of FIG. 10.

Both times that flip-flop 129 is reset, it furnishes an edge to the toggle or count input of flip-flop 132, whose output is shown as the gate signal $e_{23}$ of FIG. 10. This gate signal meets the following criteria: it starts and ends coincident with a positive-going edge of the input to the reference terminal 121 (assumed in this case to be the input signal $e_i(t)$ as previously described), and its duration is therefore equal to an integral number of full reference (in this case input) cycles. It has the further property that its length is a minimum of $T_o$, in view of the manner in which it is derived; so that if higher input frequencies are measured, the integration time will never be less than $T_o$, thereby insuring that accuracy will not degenerate as a function of stray drifts, offsets and noise effects, as it otherwise would in the event of exceptionally short integration times.

The instaneous absolute value of the input $e_i(t)$, appearing at the joined outputs of gates 124 and 125 as previously described, is applied through input resistor 134 and gate 135 to operational integrator 133. Feedback gate 138 and second input gate 139 are both open at this time. Thus, the output from the integrator 133 is the integrated signal (of $e_{17}$ taken during the gate time of $e_{23}$), as shown at $e_{24}$ in FIG. 10. The integration period is $t_1$, an integral number of periods T of the input wave, designated $n$T. The result of the integration at the end of the time $t_1=n$T, is the voltage $E_1$ (at the output of amplifier stage 137) which is equal, as described before, to $-E_{A1}t_1$ or $-E_{A1}nt$. The (−) sign results from the inversion in integrator 133.

Simultaneous with the first integration, the reference integrator 133 signal $E_r$ is applied to terminal 130 and supplies input resistor 140 driving gate 141 into the operational integrator 142. Gate 141 is activated by the signal $e_{23}$ from flip-flop 132 while feedback gate 144 is open. The result of this reference integration is apparent at the output of integrator 142 as the signal $e_{25}$ in FIG. 10. It is a ramp during the $t_1$ time interval whose slope is dependent on the value of the DC input reference $E_r$. It achieves the value $E_2=E_rt_1=-nTE_r$ at the end of the $t_1$ interval, the polarity again being negative in view of the inverting action of the integrating amplifier 142.

Flip-flop 145, is also set by the signal $e_{23}$ from flip-flop 132 at the start of the $t_1$ integrating interval to provide the signal shown as $e_{27}$ in FIG. 10. The coincidence of the setting of flip-flop 145 with the resetting of flip-flop 132 is achieved at AND-gate 146, with inverter 147 first inverting the $e_{23}$ signal to achieve the proper polarity. The resulting gate signal provided by gate 146 is shown as the waveform $e_{28}$ in FIG. 10. It is applied simultaneously to both gates 149 and 150 as an input signal and which of those latter two gates are enabled then depends upon the determination by detector 151 as to what is the polarity of the output signal from integrator 133. If the polarity, for example, is one value or X, then only gate 149 is enabled; if the other value or Y, then only gate 150 is enabled.

If gate 149 is enabled, its output enables analog gate 139 which connects the output voltage of integrator 142 to the input summing junction of integrator 133 through input resistor 152. If gate 150 is enabled, its output enables gate 153 which connects a precision inverted (by inverter 155) version of the output voltage of integrator 142 to the input summing junction of integrator 133 through input resistor 154. Of course, integrator 142 has been integrating the reference voltage $E_r$ starting from a time set by the output signal ($e_{23}$) from flip-flop 132 which controlled gate 141. Thus, the voltage at the output of integrator 142 ($e_{25}$) is the value $E_2$ in equation (6) and is used to achieve the reverse integration or down-ramp from the value of $E_1$ initially achieved by integrator 133. The polarity of $E_2$ is selected by particular gate responsive to the output of detector 151 so that the ramp is "down" (back toward zero or a reference level) regardless of the polarity of $E_1$. Thus, integrator 133 performs a reverse integration for a time $t_2$, shown as the upgoing ramp portion of $e_{24}$ starting at $R_2$ of wave $e_{21}$.

Return of the output of integrator 133 to zero is sensed in axis-crossing detector 155 which provides an output pulse shown as $e_{29}$ in FIG. 10. This pulse is gated by three other signals in AND-gate 156, i.e. the absence of the $e_{23}$ gate signal (determined by first inverting the latter in inverter 147), the absence of the output $e_{22}$ from delay multivibrator 130 (determined by first inverting $e_{22}$ via inverter 131), and the presence of the output signal $e_{27}$ from flip-flop 145. The first two of these signals are employed to insure against spurious signals due to axis-crossing indications before the start of integration.

The output of AND-gate 156 then resets flip-flop 145 (as shown in FIG. 10 at $e_{27}$) and, after a delay due to the function of delay multivibrator 157 shown at $e_{26}$ in FIG. 10, flip-flop 127 as well. A1 such time all flip-flops are then in their reset states and the converter is prepared to accept a new read command at terminal 126 pulse. Alternate to a free-running multivibrator previously described for free-running operation of the converter, delay multivibrator 157 could trigger another short delay multivibrator whose output could be used as the read command, thereby obtaining minimum delay time to the next computation.

The signal $e_{28}$ in FIG. 10 occurring at the output of gate 146 is the desired time gate signal of duration $t_2$ proportional to the phase-sensitive average of the input $e_i(t)$. As indicated in FIG. 9, it is applied to gate 148 which enables pulses from the high-frequency clock generator 158 to be counted by counter 159. The output of delay multivibrator 157 is used to command the transfer of digital information from counter 159 to the display 160 (another array of flip-flops in conventional fashion), while any read command signal applied at terminal 126 is used to reset the counter itself.

It should be noted that in the device of FIG. 9, the signals need be integrated over not less than some selected multiple of half periods of the input frequency and over at least one of such half periods, while the device of FIG. 4 simple integrates over one period. Thus, the device of FIG. 9 permits one to use the instrument with a wide range of input frequencies. For example, in an instrument designed for use with input signals from, for example, 50 Hz. to 10 kHz., integration over one period of the latter will provide a very small signal, hard to use. On the other hand, if as in the device of FIG. 9, one can use the period of the 50 Hz. wave as the minimum period (and thus measure over the large number of cycles of a 10 kHz. signal occuring during that 20 milliseconds, one can obtain signals of satisfactory amplitude at all frequencies within the range.

Figure 11:
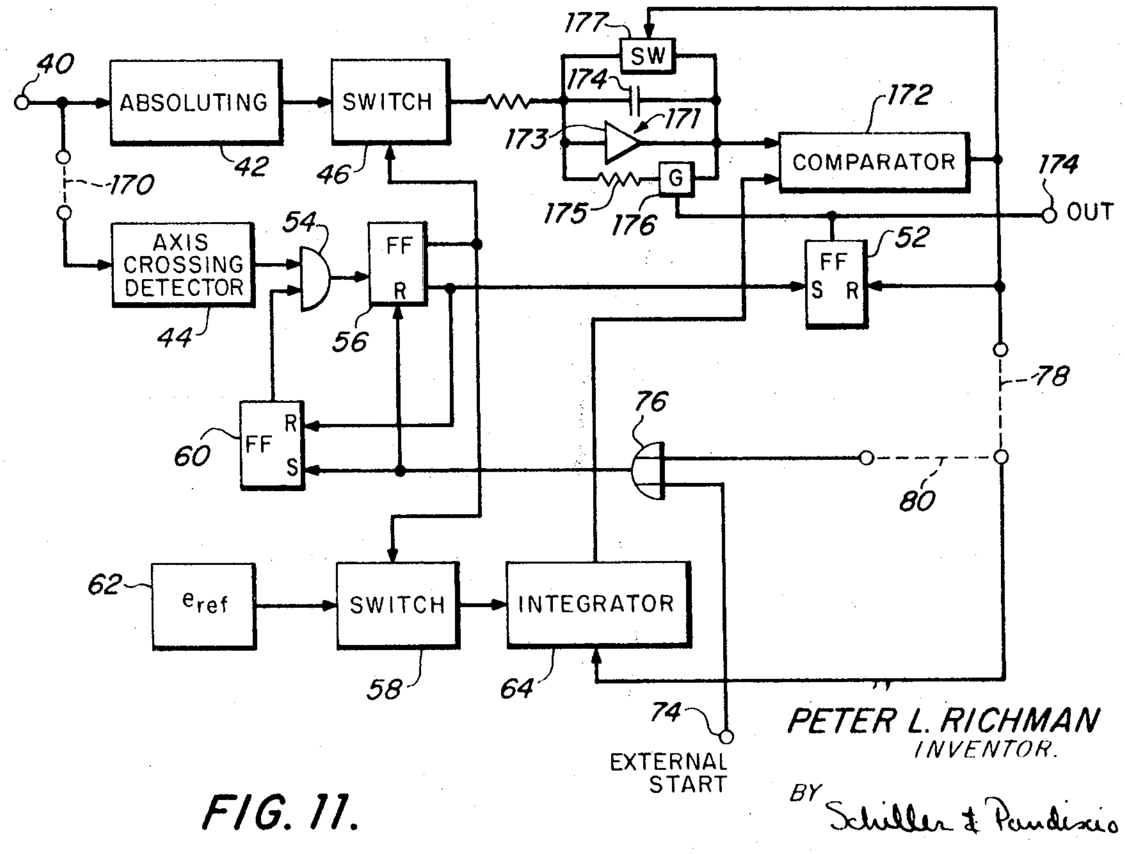
FIG. 11 is yet another device embodying the principles of the present invention operative to provide an output which is the logarithm of the input signal, shown in block diagram.

By substituting an exponential decay for the linear down ramp of the embodiments previously described, one can compute a value which is proportional to the logarithm of the input. The function of such a device can be described generally as follows: One can assume that the first integrator of the invention is charged to the voltage $E_1$ during the interval $t_1$. Assume also that some arbitrary level, say $E_2$, is used as a base line, i.e. to determine the end of the time interval $t_2$ during which the voltage $E_1$ will decay exponentially to $E_2$. Now, if the decay or down ramp is exponential, then $$(11)\quad E_2=E_1e^{-t_2/\tau}$$

where $e$ in this equation is the natural base and $\tau$ is an arbitrary scaling value that is the time constant of the decay. Taking logs of both sides, $$(12)\quad \ln(E_2/E_1)=-t_2/\tau \text{ or}$$

$$(13)\quad t_2/\tau=\ln(E_1/E_2)$$

which establishes that for $E_2$ and $\tau$ constant, $t_2$ is proportional to the logarithm of the input. The embodiment shown in FIG. 11 is an example of a logarithmic converter based on the principles of the present invention. This is quite similar to the embodiment of FIG. 3 which shows a linear implementation, and indeed, like numerals denote like parts.

As shown, the device of FIG. 11 includes input terminal 40 connected to absoluting circuit 52 and connectable to axis-crossing detector 44 through jumper 170 shown in broken lines. The latter indicates that both the phase-sensitive and phase-insensitive options are available here also. The output of absoluting circuit is connected through switch 46 to integrator 171. The output of detector 44 is connected to gate 54 which in turn feeds flip-flop 56. One output of the latter is connected to control operation of switches 46 and 58. The other output of flip-flop 56 is connected to flip-flop 52 and to flip-flop 60. The output of one latter also feeds gate 54. Switch 58 is connected to control transfer of a signal from source 62 of the reference signal $e_{ref}$ to integrator 64.

However, the device of FIG. 11 includes comparator 172. The latter is, in effect, quite similar to axis-crossing detector 50 of FIG. 3, but unlike the latter does not use a zero-volt reference. Instead comparator 172 includes two input terminals connected respectively to the outputs of integrators 171 and 64 so as to use the signals from the latter as a reference voltage against which to compare the voltage output from integrator 171.

The latter typically comprises the usual high gain inverting amplification stage 173 having feedback capacitor 174 connected between its input and output. Also connected across state 173 is discharge resistor 175 in series with analog gate 176. The output of flip-flop 52 is directly connected to control operation of gate 176. Also, the output of comparator 172 is connected as a control line to switch 177 connected across stage 173 as a reset switch for integrator 171 as is well known in the art. Additionally, comparator 172 is connected to provide a reset signal line to flip-flop 52, OR-gate 76 and integrator 64. OR-gate 76 is also connected to external start terminal 74 and its output is connected as in FIG. 3, to the set terminal of flip-flop 60. Jumpers 78 and 80 are provided if desired for the reasons heretofore noted in connection with FIG. 3. The output of flip-flop 52 is also connected to output terminal 174.

Figure 12:
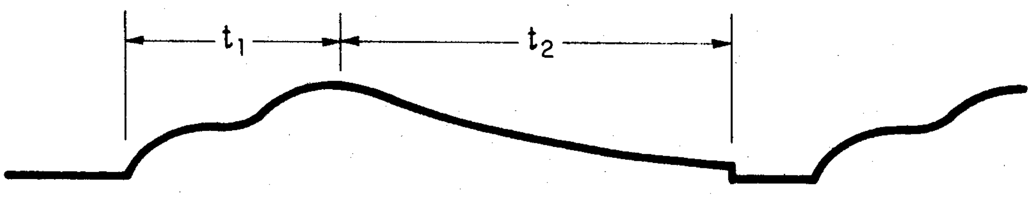
FIG. 12 is an idealized waveform illustrating the operation of the device of FIG. 11.

Many of the waveforms of FIG. 4 can be used to describe the operation of the device of FIG. 11 in conjunction with the one waveform of FIG. 12. It will be remembered that $E_1$ is the integral of the absolute value of the AC input over one cycle (as in FIG. 3) or several cycles (as in FIG. 9) while $E_2$ is the integral of the reference $E_R$ taken over that same interval.

Combining these definitions with equation (13) we find $$(14)\quad t_2/\tau=\ln\left(\frac{E_{AV}}{E_R}\right)$$

To effect this it should be noted in FIG. 11 that the gate signal $e_9$ at the output of flip-flop 52 initiates a controlled decay command to integrator 171. This serves to gate resistor 175 across integrating capacitor 174 rather than, as in FIG. 3, gating the output of the second integrator to the input of the first integrator. The output then of integrator 171 is shown in FIG. 12 and differs from its counterpart, $e_{10}$ in FIG. 4, in that during $t_2$ the decay is exponential rather than linear, due to the RC time constant established by closure of gate 176. Further the decay continues until it reaches a base value equal to the voltage provided at the output of integrator 64. At this point, comparator 172 generates a pulse output the same as $e_{11}$ in FIG. 4. The operation is thus quite similar to that described in connection with the linear embodiment in FIGS. 3 and 4. Of course, $t_2$ in FIG. 12 may be shorter or longer, as the case may be, than $t_2$ in FIG. 4 and any showing that the two are the same is merely for convenience and is not occasioned by necessity.

It should be noted that reference source 62 in FIG. 11 as described provides a DC level, but can also comprise an AC reference, $e_R(t)$ preferably of the same frequency as the input voltage $e_i(t)$ and an absoluting or full-wave rectification circuit. In such case, the circuit of FIG. 11 will provide an output signal from flip-flop 52 that is proportional in duration $t_2$ as shown in equation (13) except that both $E_1$ and $E_2$ are AC values.

Figure 13:
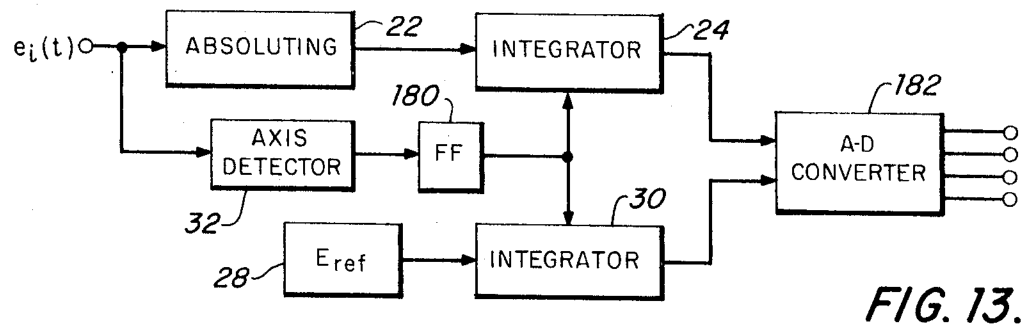
FIG. 13 is a block diagram of a simple AC/digital converter employing the principles of the present invention.

A number of devices can be formed using the principles of the present invention to provide digital outputs in other ways than already described. For example, the circuit of FIG. 13 is similar to that of FIG. 2, like numerals denoting like parts, except that integrators 24 and 30 are explicitly timed by the output of flip-flop 180. The latter is connected to be triggered by the signal from axis-crossing detector 32. Also, and more importantly, the outputs of integrators 24 and 30 are connected to a digital voltmeter or A/D converter 182 so that the output signal from integrator 30 is used as a reference against which the output signal from integrator 24 is compared. In essence then, converter 182 serves a function quite similar to that of comparator 172 in FIG. 11 except of course than the comparison results in a digital rather than an analog output. The output from converter 182 is not a time interval, but is a digital value proportional to the ratio of $E_1$ to $E_4$.

Figure 14:
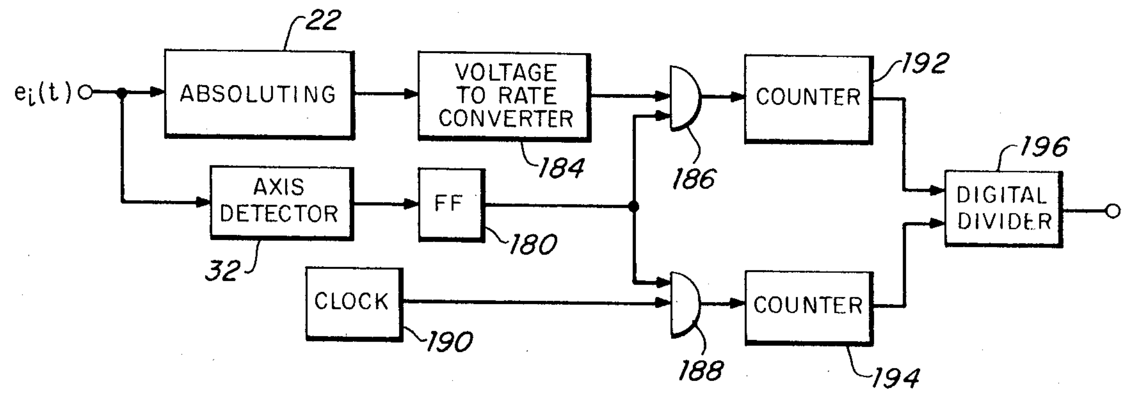
FIG. 14 is a block diagram of yet another version of an AC/digital converter according to the present invention.

The digital version shown in FIG. 14 is similar to that of FIG. 13 but uses no analog integrators, again like numerals denoting like parts. Here the output of absoluting circuit 22 is connected to voltage-to-rate converter 184 which typically can be a voltage-controlled oscillator or the like. The output of converter 184 is connected to one input of AND-gate 186. Another AND-gate 188 is provided and has an input connected to the output of clock 190. The signal from clock 190 serves as a digital equivalent of the voltage reference $e_{ref}$ previously described. Both AND gates are enabled or controlled by the output of flip-flop 180 responsively to the operation of axis-crossing detector 32. The outputs of gates 186 and 188 are connected respectively to digital counters 192 and 194. The outputs of the counters are connected to digital divider 196. The latter can be any of a number of conventional systems that provides a digital output signal proportional to a ratio of the two digital input signals.

In the embodiment of FIG. 14, it will be appreciated that the counters serve as integrators for the digital signals provided respectively the clock and by the voltage-to-rate converter.

Figure 15:
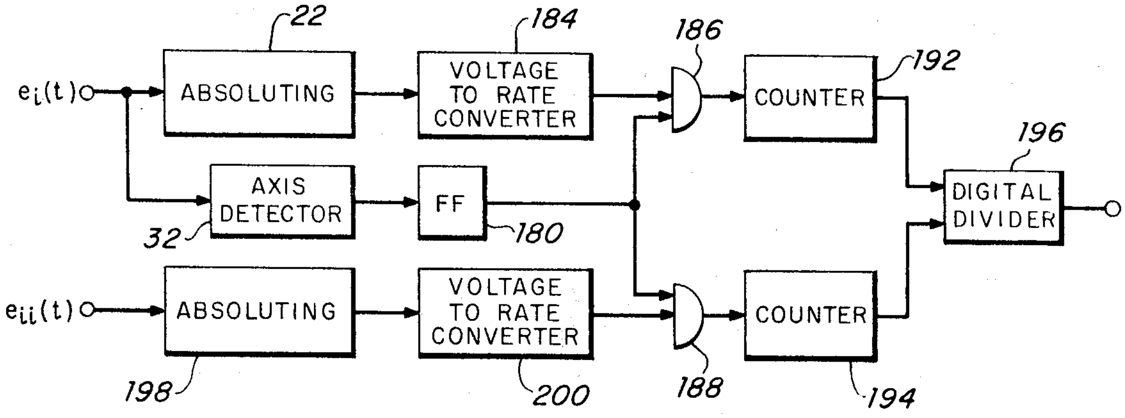
FIG. 15 is a block diagram of a third form of AC/digital converter according to the present invention.

In yet another embodiment, shown in FIG. 15, as a variant of the device of FIG. 14, is very similar. However, the device of FIG. 15 omits clock 190 as an input to gate 188 and substitutes therefor a second absoluting circuit 198 intended to have another AC signal $e_R(t)$ applied to its input as a reference, and being connected at its output to a second voltage-totrate converter 200.

The output of the latter is connected as an input to gate 188.

The output from divider 196 is of course a digital value proportional to the AC/AC ratio of the two input signals.

On all three of the digital representations, it is apparent that phase-sensitive implementations can readily be formed by the technique described in conjunction with FIG. 9; also the devices of FIG. 14 and FIG. 15 can provide logarithmic outputs by employing digital logarithmic conversion instead of simple digital division.

The use of three separate input signals in some forms of the invention as described leas to some interesting capabilities of the system. For example, if the embodiment of FIG. 2 is used in connection with the circuit of FIG. 5 to achieve a DC output, the signal provided as $e_2$ in FIG. 2 and $e_{ref}$ in FIG. 5 can be from the same source. In such case, the output from sample-and-hold 88 will be proportional to the ration $(E_{AV})(e_{ref})/e_2$. Inasmuch as $e_{ref}=e_2$, the result is $E_{AV}$, apparently independent of the value of $e_{ref}$ or $e_2$. The advantage here, of course, is that one is relieved of the necessity of providing a precision $e_{ref}$ (or $e_2$) and can indeed use much less expensive signal sources.

This ability to provide a ratio which is the product of two values divided by a third can yield other interesting results. For example, as shown in FIG. 16, the principles of the present invention can be employed to provide a device which can quickly compute the quantity XY/Z in general where X, Y and Z are values unrestricted as to bring either AC or DC and particularly can quickly compute power.

Figure 16:
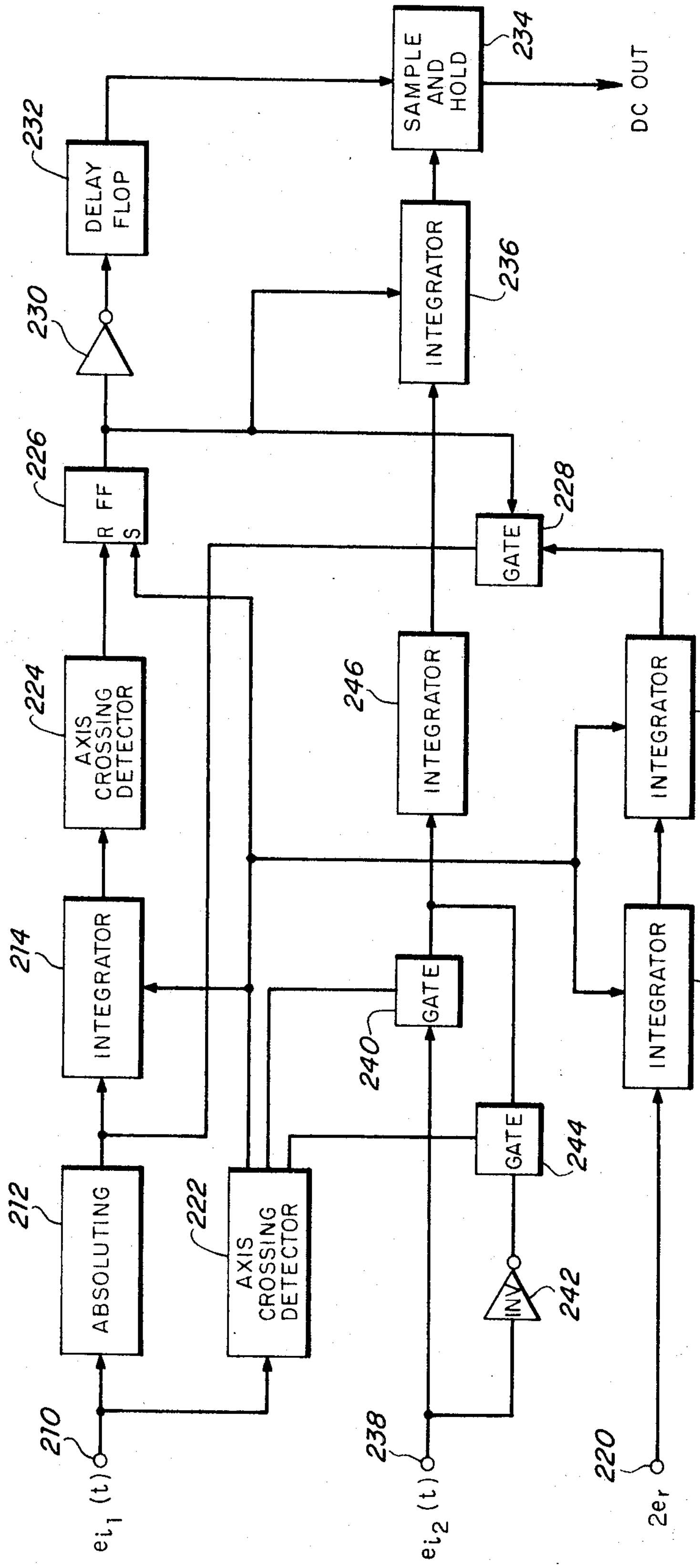
FIG. 16 is a block diagram of a power measuring device employing the principles of the present invention.

The device of FIG. 16 includes input terminal 210 at which a first input wave, for example, AC signal $e_{i1}(t)$ can be applied. Terminal 210 is connected through absoluting circuit 212 to the input of first integrating circuit 214. In place of integrator 30 of FIG. 2, the device of FIG. 16 includes series integrators 216 and 218 for doubly integrating an input signal $2e_r$ applied at input terminal 220. Timing control for all three integrators 214, 216 and 218 is provided in the form of axis-crossing detector 222 which is connected for detecting axis-crossings of the wave $e_{i1}(t)$ for example. Detector 222 preferably includes counters or other known means for producing separate signal trains in this example, at each axis-crossing and also at some multiple number of half-cycles of $e_{i1}(t)$. The output from detector 222 providing the latter signal is connected for determining the integration time $t_1$ of integrators 214, 216 and 218. It will be recognized that with the exception of the double-integration noted, the circuit thus described is substantially that of FIG. 2 without any divider 31.

Now, as in the circuit of FIG. 3, the system of FIG. 16 provides means for providing a reverse integration using the summation in integrator 218 as the argument and starting from the summation in integrator 214 as an initial condition. To this end, the output of integrator 214 is connected to axis-crossing detector 224, the output of which is connected to the reset input of flip-flop 226. The set input of the latter is connected to the same output from detector 222 as is used to control the integration time of integrator 214. The output of flip-flop 226 is connected to the control input of precision analog gate 228. The input and output of the latter are respectively connected to the output of integrator 218 and the input to integrator 214. It will be recognized that flip-flop 226 serves the same purposes and is indeed the counterpart of flip-flop 52 in FIG. 3.

The output of flip-flop 226 is connected also to the input of inverter 230 which has its output in turn connected to delay-flop 232. The output of delay-flop 232 is connected to the control terminal of sample-and-hold circuit 234. The signal input to the latter is connected to the output from yet another integrator 236. It will be recognized that the assemblage of components 230, 232 and 234 and 236 is quite similar to the circuit of FIG. 5 (omitting, for simplicity, shaper 90 and its associated leads), flip-flop 226 serving as the source of input signal to the inverter in place of flip-flop 52. Also, and most importantly, as $e_{ref}$ input to integrator 236, the device of FIG. 16 includes a signal source comprising an input terminal 238 at which a second input wave, for example AC signal $e_{i2}(t)$ can be applied. Terminal 238 is connected to the input of analog gate 240 and also through inverter 242 to the input of analog gate 244. The outputs of gates 240 and 242 are connected to a common terminal at the input of integrator 246. Gates 240 and 242 are also respectively connected to outputs from axis-crossing detector 222 so as to be alternately and mutually exclusively enabled on successive axis-crossings of opposite polarity of the wave $e_{i1}(t)$. The output of integrator 246 is connected to constitute the input to integrator 236.

The operation of the system is most simply described as follows:

In accordance with the principles of the invention previously noted, the double integration of the reference $2e_r$ for the time $t_1$ yields at the output of integrator 218 at the end of that time interval, a signal $E_r$ such that

(15) $E_r=e_r(t_1)^2$

The output of absoluting circuit 212 is of course $|e_{i1}(t)|$ and this is integrated during $t_1$ in integrator 214 to provide

(16) $$\int_0^{t_1}|e_{i1}(t)|dt=t_1E_{1AV}$$

The input $e_{i2}(t)$ to integrator 246 is gated such that the input signal passes through gate 240 only during, for example, the first half cycle of the input $e_{i1}(t)$ as noted by axis-crossing detector 222, i.e. from $t_0$ to $t_{1/2}$. Similarly, the inversion of input signal $e_{i2}(t)$ passes through gate 244 only from $t_{1/2}$ to $t_1$. Thus, the output of integrator 246 can be expressed as

(17) $$\int_0^{t_{1/2}}|e_{i2}(t)dt-\int_{t_{1/2}}^{t_1}e_{i2}(t)dt=\int_0^{t}|e_{i2}(t)|\cos\varphi dt=t_1E_{2AV}\cos\varphi$$

Here Φ is the phase angle, if any, between $e_{i2}(t)$ and $e_{i2}(t)$ during $t_1$, these latter two waves being assumed to be sinusoids of the same frequency.

When integration for $t_1$ as determined by the output of detector 222 is complete, the signal from the latter sets flip-flop 226 which thus enables gate 228 and starts integrator 236. Thus, the signal $E_r$ at the output of integrator 218 is applied through gate 228 to the input of integrator 214.

The signal $E_r$ is thus used (with appropriate polarity) to ramp down integrator 214 from its initial condition defined in equation (16) to establish $t_2$ or,

(18) $$t_1E_{1AV}=\int_0^{t_2}E_rdt$$

From Equation (15), then

(19) $$t_1E_{1AV}\int_0^{t_2}e_r(t_1)^2dt=e_r(t_1)^2(t_2)$$

or

(20) $$t_2=\frac{E_{1AV}}{e_rt_1}$$

The end of $t_2$ is detected by axis-crossing detector 224 which notes when the output from integrator 214 has reached its zero state. The consequent pulse from detector 224 resets flip-flop 226, terminating the signal from the latter which serves thus to disable gate 228 and stop integrator 236. The duration of the signal from flip-flop 226 is, of course, $t_2$.

Meanwhile during $t_2$, the output from integrator 246 described in equation (17) is applied to integrator 236, the output of the latter is then

(21) $$\int_0^{t_2}t_1E_{2AV}\cos\varphi dt=t_2t_1E_{2AV}\cos\varphi$$

Substituting equation (20) into (21) for $t_2$ (22)

$$t_2 t_1 E_{2AV} \cos\varphi = (t_1 E_{2AV} \cos\varphi) \frac{E_{1AV}}{e_r t_1} = \frac{E_{1AV} E_{2AV} \cos\varphi}{e_r}$$

Average power in a circuit is defined as EI cos Φ where E is the effective voltage, I the effective current and cos Φ the power factor. Merely by using a series resistor or current transformer, it will be apparent to those skilled in the art that $E_{1AV}$ can be made proportional to a current I for the voltage $E_{2AV}$.

Because $e_r$ is a known DC reference voltage it will be apparent that equation (21) expresses a measurement of power obtained upon actuation of sample-and-hold circuit by the output of delay-flop 232 as previously described in connection with FIG. 7. The total measurement can be thus taken over a very short time interval. For cases where for example, all inputs at terminals 210, 220 and 238 are DC, of course one can use a line frequency of 66 cycles to generate the requisite gating signals.

Since certain changes may be made in the above apparatus without departing from the scope of the invention herein involved, it is intended that all matter contained in the above description or shown in the accompanying drawings shall be interpreted in an illustrative and not in a limiting sense.

I claim:

1. A device for converting a parameter of a periodically varying input signal into a time period proportional thereto, and comprising, in combination,
   first means for integrating over a first time interval which is an integral number of half cycles of the input signal fundamental, a first signal proportional to the amplitude of said input signal, so as to obtain a first time integral;
   second means for integrating a reference signal over said first time interval so as to obtain a second time integral; and
   means for comparing the time integrals of said first and reference signals by integrating in said first means said second time integral over a second time interval starting from the value of said first time integral and ending when the output signal from said first means reaches a predetermined value, so as to provide an output signal having a duration proportional to said second time interval and thus to a ratio of said integrals.

2. A device as defined in claim 1 including means for establishing said first signal proportional to the absolute value of said input signal.

3. A device as defined in claim 2 wherein said means for establishing said first signal comprises means for providing full wave rectification of said input signal.

4. A device for converting a parameter of a periodically varying input signal into a time period proportional thereto, and comprising, in combination
   means for establishing a first signal proportional to the absolute value of the amplitude of said input signal;
   said means for establishing said first signal comprising means for inverting said input signal, an axis-crossing detector responsive to an AC signal of the same fundamental frequency as said input signal, and a pair of analog gates, one of which has an input connected to the output of said inverting means, the other having an input connected to the source of said input signal, both having their outputs connected to a common junction, said gates being connected to the output of said axis-crossing detector so as to be alternately operable for respectively applying said input signal and the inversion of said input signal to said common junction;
   first means for integrating said first signal over a time interval;
   second means for integrating a reference signal over said time interval; and
   means for comparing the time integrals of said first and reference signals so as to provide an output signal having a duration proportional to a ratio of said integrals.

5. A device as defined in claim 1 wherein said means for establishing said first time interval comprises an axis-crossing detector.

6. A device as defined in claim 1 wherein said means for integrating both comprise integrating operational amplifiers.

7. A device as defined in claim 1 wherein said means for comparing comprises said first means, means for connecting the output of said second means to the input of said first means, and means for measuring the time required for said first means to integrate said second time integral starting from the value of said first time integral and ending when the output signal from said first means reaches said predetermined value.

8. A device as defined in claim 7 including an axis-crossing detector connected to said first means so as to provide an output signal when the output signal from said first means reaches said predetermined value, and means for producing an output signal commencing with the connection of the output of said second means to the input of said first means and terminating responsively to the output signal from said axis-crossing detector.

9. A device as defined in claim 1 including means for converting said output signal duration into a digital value.

10. A device as defined in claim 9 wherein said means for converting comprises a digital clock, a gate enabled by said output signal and having an input connected to said clock, and a counter connected to the output of said gate.

11. A device as defined in claim 1 including means for establishing said first time interval as an even number of half cycles of the fundamental of said input signal.

12. A device as defined in claim 1 including means for establishing said first time interval as an odd number of half-cycles of the fundamental of said input signal.

13. A device as defined in claim 1 including means for establishing said first time interval as an integral number of half cycles of the fundamental of a phase reference signal of the same frequency as the fundamental of said input signal.

14. A device for converting a parameter of a periodically varying input signal into a time-period proportional thereto, and comprising, in combination,
   means for establishing a time interval as an integral number of half-cycles of the fundamental of a phase reference signal of the same frequency as the fundamental of said input signal;
   first means for integrating over said time interval, a first signal proportional to a cosine function of any phase angle difference between said phase reference signal and said input signal;
   second means for integrating said reference signal over said time interval; and
   means for comparing the time integrals of said first and reference signals so as to provide an output signal having a duration proportional to a ratio of said integrals.

15. A device as defined in claim 14 wherein at least said first means for integrating comprises an integrating operational amplifier, and including means for determining the polarity of the output signal from said integrating operational amplifier, means for inverting the output signal from said second means for integrating, and means for selectively connecting either the inverted output signal or the noninverted output signal from said second means for integrating according to the relative polarity of the output signal from said integrating operational amplifier as detected by said means for determining said polarity.

16. A device for converting a parameter of a periodically varying input signal into a time period proportional thereto, and comprising, in combination,
   means for establishing a first time interval as an integral number of half-cycles of the fundamental of a phase reference signal of the same frequency as the fundamental of said input signal, and comprising an axis-crossing detector connected to a first terminal at which said phase reference signal is intended to be applied,
   first means for integrating over said first time interval, a first signal proportional to the absolute value of said input signal;
   second means for integrating a reference signal over said first time interval; and means for comparing the time integrals of said first and reference signals so as to provide an output signal having a duration proportional to a ratio of said integrals.

17. A device as defined in claim 16 including means for establishing said absolute value and comprising a second terminal at which said input signal is intended to be applied and isolated from said first terminal, means connected to said first terminal for inverting said input signal, a first analog gate having an input connected to said first terminal, a second analog gate having an input connected to the output of said means for inverting said gates having their outputs connected to a common junction, said gates being connected to the output of said axis-crossing detector so as to be alternately and mutually exclusively operable for respectively connecting said input signal and its inversion to said common junction as a cosine function of any phase angle difference between said phase reference signal and said input signal.

18. A device as defined in claim 1 including means for providing said reference signal as a substantially steady-state DC signal.

19. A device as defined in claim 1 including means for providing said reference signal as a full-wave rectified AC signal of substantially the same frequency as the fundamental of said AC input signal.

20. A device as defined in claim 1 including means for converting said output signal duration into a signal having amplitude proportional to said duration.

21. A device as defined in claim 20 wherein said means for converting comprises means for integrating an auxiliary input signal for a period proportional to said output signal duration, means for sampling and holding the output signal from the last-named means, and means for periodically reading out the amplitude of the signal stored in said sample-and-hold means.

22. A device as defined in claim 21 wherein said auxiliary input signal is said reference signal.

23. A device for converting a parameter of an input signal into a time period proportional thereto, and comprising, in combination, first means for integrating over a time interval, a first signal proportional to the amplitude of said input signal;

second means for integrating a reference signal over said time interval;

means for comparing the time integrals of said first and reference signals so as to provide an output signal having a duration proportional to a ratio of said integrals; and means for converting said output signal duration into a signal having amplitude proportional to said duration;

said means for converting comprising a first integrator for integrating an auxiliary input signal for a period proportional to said output signal duration, a second integrator for integrating over said period the output signal from the first integrator, means for sampling and holding the output signal from the second integrator, and means for periodically reading out the amplitude of the signal stored in said sample-and-hold means.

24. A device for converting a parameter of an input signal into a time period proportional thereto, and comprising, in combination, first electrical means for integrating over a first time interval, a first signal proportional to the amplitude of said input signal;

means for establishing said first signal proportional to the absolute value of said input signal, said first means being capable of selectively integrating as a direct function of time, or being discharged at a rate which is an exponential function of time, means for connecting said means for establishing said first signal to said first means and for controlling the latter so that it integrates said first signal as a direct function of said first time interval;

means for controlling said first means so that following integration of said first signal, said first means is discharged at a rate which is an exponential function of time;

means for comparing the time integrals of said first and reference signals by determining a second time interval required for the output signal from the discharging first means to reach an amplitude predetermined relative to the amplitude of the output signal from said first means at the beginning of said first time interval, so that said second time interval has a duration proportional to a ratio of said integrals;

second means for integrating a reference signal over said first time interval;

25. A device as defined in claim 24 including means for providing said reference signal as a substantially steady-state DC signal.

26. A device as defined in claim 24 including means for providing said reference signal as a full-wave rectified AC signal having substantially the same frequency as the fundamental of said AC input signal.

27. A device for converting a parameter of a periodically varying input signal into a digital output signal proportional thereto, and comprising, in combination, a voltage-to-rate converter connected for providing a pulse train having a repetition rate proportional to said input signal, a first gate having an input connected to the output of said converter, means for enabling said first gate for a time interval which is an integral number of half-cycles of the fundamental of said input signal, and a first counter for counting the output of said first gate, clock means for producing a reference pulse train of predetermined repetition rate, a second gate having an input connected to the output of said clock means, means for enabling said second gate for said time interval, and a second counter connected for counting the output of said second gate, and means for comparing the counts in said counters with one another to provide a ratio having a digital value proportional to said parameter.

28. A device as defined in claim 27 wherein said means for comparing comprises a digital divider connected for dividing the total in one counter by the total in the other counter.

29. A device as defined in claim 27 wherein said clock means comprises an input terminal at which an AC reference wave is intended to be applied, means connected to said terminal for providing a signal which is the absolute value of said AC reference wave, and a second voltage-to-rate converter for producing said reference pulse train with a repetition rate proportional to said absolute value of said AC reference wave.

30. A device for converting a parameter of a periodically varying input signal into a digital output proportional thereto, and comprising, in combination, first means for integrating over a time interval which is an integral number of half cycles of the input signal fundamental, a first signal proportion to the absolute amplitude of said input signal;

second means for integrating a reference signal over said time interval; and an analog-to-digital converter connected such that the output signal from said first means is compared to the output signal from said second means so as to provide an output signal having a digital value proportional to a ratio of the time integrals of said first and reference signals.

* * * * *

UNITED STATES PATENT OFFICE
CERTIFICATE OF CORRECTION

Patent No. 3,624,643 Dated November 30, 1971

Inventor(s) Peter L. Richman

It is certified that error appears in the above-identified patent and that said Letters Patent are hereby corrected as shown below:

Column 15, line 35, the term -- unipolar -- should be inserted before "reference";

Column 15, line 72, the term -- unipolar -- should be inserted before "reference";

Column 18, lines 17 and 18 should be inserted between lines 8 and 9;

Column 18, line 60, the term -- unipolar -- should be inserted before "reference".

Signed and sealed this 24th day of October 1972.

(SEAL)
Attest:

EDWARD M.FLETCHER,JR.
Attesting Officer

ROBERT GOTTSCHALK
Commissioner of Patents